July 4, 1950

L. N. SMITH ET AL 2,513,685

LAWN MOWER

Filed June 21, 1948

Inventor
ALEXANDER SMITH
LUCIUS N. SMITH

Jennings & Carter
Attorneys

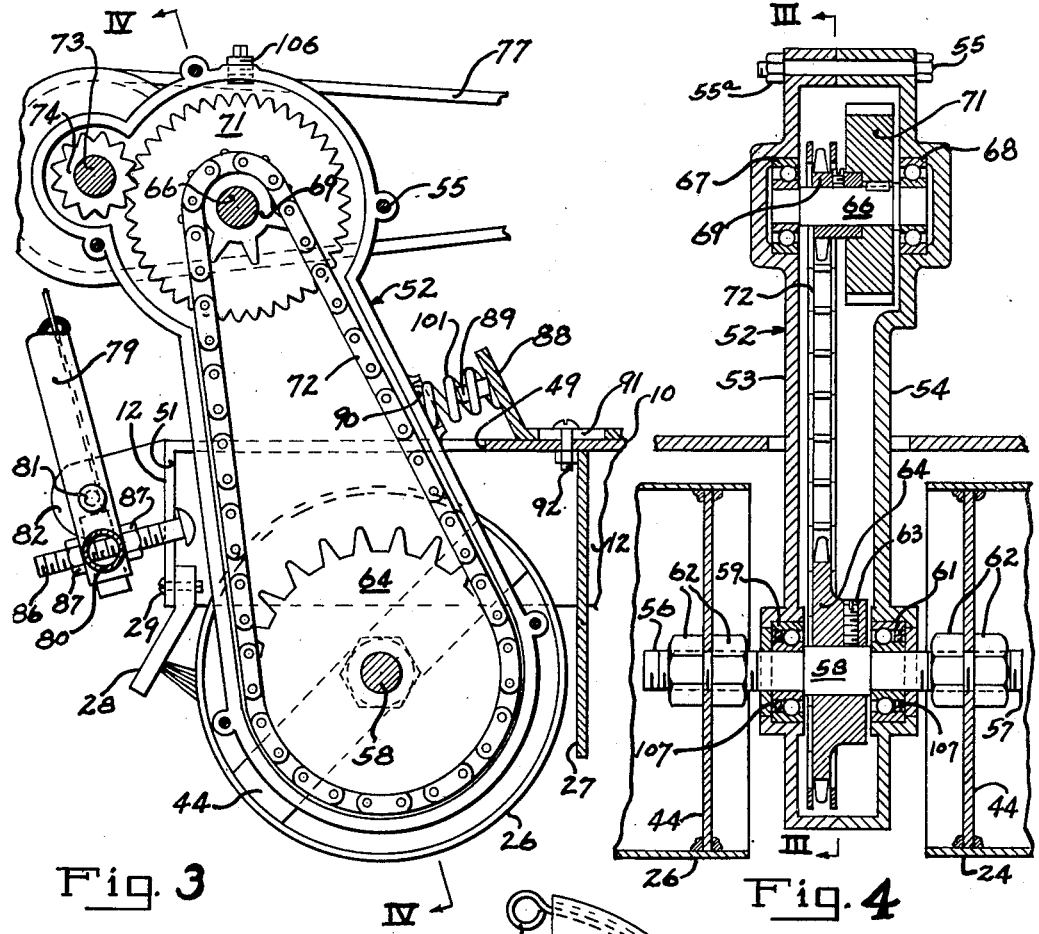
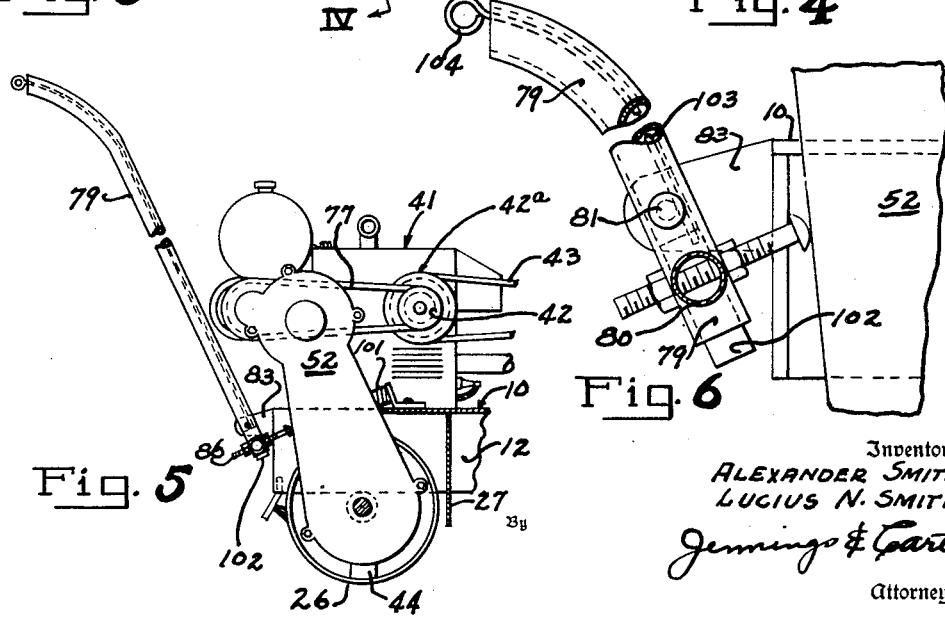

Patented July 4, 1950

2,513,685

UNITED STATES PATENT OFFICE 2,513,685

LAWN MOWER

Lucius N. Smith and Alexander Smith, Montverde, Fla.

Application June 21, 1948, Serial No. 34,195

9 Claims. (Cl. 56—25.4)

The present application is an improvement in a law mower embodying a frame having a driving and supporting roller at the rear end, a plate at the front end disposed to slide along the ground to support the mower at the front, and a cutter rotating in a horizontal plane above the sliding plate. In actual and extended operation we have found that the principles of construction and operation of the above mentioned lawn mower are satisfactory in every way, and that the mower is highly efficient in cutting grass to uniform height, regardless of the length of the grass, and that the same is particularly useful for mowing irregular or rough lawns.

The primary object of the present invention is to provide an improved means for driving the supporting roller for the mower embodying improved mechanism for effecting disengagement of the roller from the driving motor when desired.

Another and more specific object is to provide a power transmission for rotating the ground engaging and supporting roller embodying a gear and chain housing pivotally mounted to rock about the center of rotation of the roller, together with means to rock the housing, thereby to loosen a belt which connects the motor to a shaft projecting from the housing, thus providing a clutch between the roller and motor.

A further object is to provide a mower of the character designated in which the gear housing is rocked to disengage the roller from the motor when the handle of the mower moves rearwardly a predetermined distance, thereby to stop forward movement of the mower whenever the operator lets go of the handle.

A further object is to provide a combined power transmission and clutch for a lawn mower which is simple of construction, and in which the gears, sprockets, and chains therefor are completely enclosed in a lubricant tight housing, thus assuring long life for the moving parts and complete safety for the operator.

Apparatus embodying the features of our invention is illustrated in the accompanying drawings forming a part of this application in which:

Fig. 3 is a detail sectional view of the transmission and clutch taken along line III—III of Fig. 4;

Fig. 4 is a detail sectional view taken generally along line IV—IV of Fig. 3;

Fig. 5 is a fragmental and elevational view partly broken away and in section and illustrating the handle of the lawn mower in position to disengage the roller from the driving motor; and, Fig. 6 is an enlarged fragmental sectional view of the lower end of the handle with the same in the position shown in Fig. 5.

Figure 1:
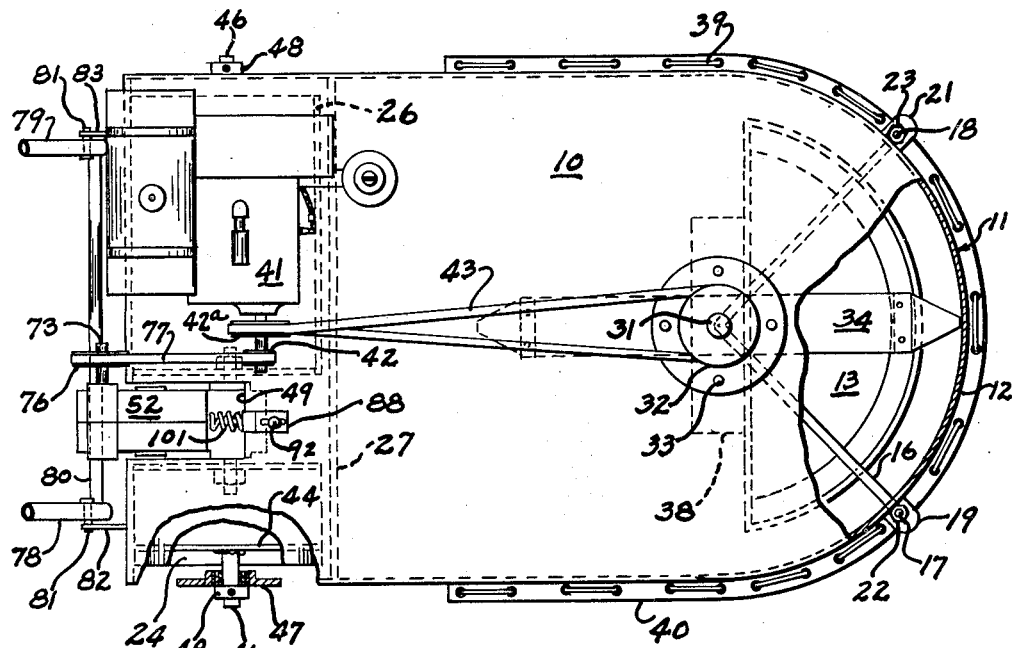
Fig. 1 is a plan view of our improved mower, partly broken away and in section.

Referring now to the drawings for a better understanding of our invention, our improved lawn mower comprises a body formed with a metal cover 10 having a semicircular forward end 11. A downturned flange 12 extends all around the body. The support for the front of the body comprises a semicircular pan 13 disposed to slide along the ground and turned up along its rounded, forward periphery as indicated at 14. The pan 13 is welded or otherwise secured to a V-shaped member 16 having vertical arms 17 and 18 passing through brackets 19 and 21 on the downturned flange 12. The height of the pan, with respect to the body, may be adjusted by means of nuts 22 and 23 on the threaded upper ends of the arms 17 and 18. At the rear, the body is supported by means of a pair of rollers 24 and 26, the roller 24 being shorter than the roller 26 as shown in Fig. 1 of the drawings. Extending transversely of the body in front of the rollers 24 and 26 is a guard plate 27 to prevent grass from gathering on the rollers. Also, we preferably provide brushes 28 which extend across the mower at the rear of the rollers for cleaning the same of any accumulation of dirt and grass. As shown, the brushes 28 may be secured in any suitable manner to the depending flange 12 at the rear of the body, as by means of screws 29.

Extending downwardly through the cover 10 directly over the V-shaped pan support is a shaft 31 which is mounted for rotation in a suitable bearing 32, secured to the cover 10 by nuts and bolts 33. Mounted on the lower end of the shaft 31 is a horizontally disposed cutter bar 34 which is vertically adjustable on the shaft 31 by means of nuts 36 and 37 to vary the height at which the grass is cut. The cutter bar 34 may be provided with a breaker bar 38, which we have found prevents long weeds and grass from winding about the shaft 31, as described in said application. Suitable guards in the form of depending, U-shaped wires 39, passing loosely through an outstanding flange 40 carried on the body, may be provided about the front and sides of the mower, thereby to enclose the rotating cutter to the extent that an operator may not accidentally bring his foot or hand into engagement with the cutter.

Mounted at the rear of the body, on the cover plate 10, and directly over the rollers 24 and 26, is a driving motor 41, preferably an internal combustion engine. The motor 41 is provided with pulleys 42 and 42a. The cutter shaft 31 is driven from the pulley 42a through a belt 43.

The foregoing construction is described more fully in detail in our copending application above identified. Our present invention relates more particularly to an improved driving and clutch connection between the motor 41 and the rollers 24 and 26, which will now be described in detail.

The rollers 24 and 26 may conveniently be fabricated from a cylindrical shell with spokes 44 welded in each end. The outer end of each roller carries stub shafts 46, welded to the spokes 44 thereof. The stub-shafts 46 are rotatably supported in suitable bearings mounted in brackets 47, secured in any suitable manner to the depending flanges 12. The outer ends of the shafts 46 carry collars 48 to hold the shafts in the bearings.

The cover plate 10 is notched as indicated at 49, and the depending flange 12 at the rear of the body is notched in line therewith as indicated at 51, thereby to provide an opening at the rear of the body. As shown more clearly in Figs. 3 and 4 of the drawings, a gear and chain housing 52 passes through the notches and the lower end is disposed between the inner ends of the rollers 24 and 26. The housing 52 is split to provide halves 53 and 54, and are held together by means of bolts 55 and nuts 55a.

Projecting from either side of the housing 52 at the lower end thereof are the threaded ends 56 and 57 of a driving shaft 58. The shaft 58 is journalled in suitable anti-friction bearings 59 and 61 mounted in the housing halves 53 and 54. The threaded ends 56 and 57 pass through openings in the spokes 44 of the rollers 24 and 26, and are secured thereto by means of nuts 62. Secured to the shaft inside the housing, by means of a set screw 63, is a sprocket 64.

In the upper part of the housing 52 is a countershaft 66, mounted for rotation in suitable anti-friction bearings 67 and 68. Fast on the shaft 66 is a sprocket 69 and a gear 71. A sprocket chain 72 passes over the sprockets 64 and 69.

Projecting from the side of the housing 52 adjacent the motor 41 is a driven shaft 73, likewise mounted for rotation on suitable bearings, not shown. The shaft 73 carries a pinion 74 in mesh with the gear 71. Mounted on the outer end of the shaft 73 is a pulley 76 which is driven through a belt 77 from the pulley 42. It will be apparent that upon rotation of shaft 73, the countershaft 66 is driven through the gear 71 and pinion 74, and that the shaft 57 is driven through the sprockets 64 and the chain 72. It will likewise be apparent that the entire gear housing 53 is pivotally mounted on the shaft 58, and is free to rock forwardly and rearwardly of the mower in the notches 49 and 51 in the cover plate 10 and depending flange 12.

At the rear of the mower we provide an operator's handle comprising a pair of tubular members 78 and 79, cross braced by a tubular member 80. The handle assembly is supported for pivotal movement on pins 81, passing through brackets 82 and 83 secured to the depending flange 12 at the rear of the mower body. Passing through the cross member 80 in position to engage the rear side of the housing 52 is a round-headed stud 86. The stud is held in place on the cross member 80 by means of nuts 87. The upper end of the handle extends rearwardly past the pivot point 81 whereby gravity acts to move the lower end toward the housing 52. The head of the stud 86 thus engages the side of the housing 53, thereby to rock the same forwardly and disengage the motor from the rollers 24 and 26 as will be explained.

Mounted on top of the cover plate 10 forwardly of the notch 49 is a bracket 88 carrying a rearwardly projecting pin 89. The bracket 88 may be slotted as indicated at 91 and held in place by means of a bolt and nut 92 thereby to be adjustable toward and from the rear of the mower. On the front of the housing 52 is a socket 90 for receiving one end of a spring 101. The spring surrounds the pin 89 and biases the upper end of the gear housing rearwardly, the lower end rocking on the shaft 58.

Figure 2:
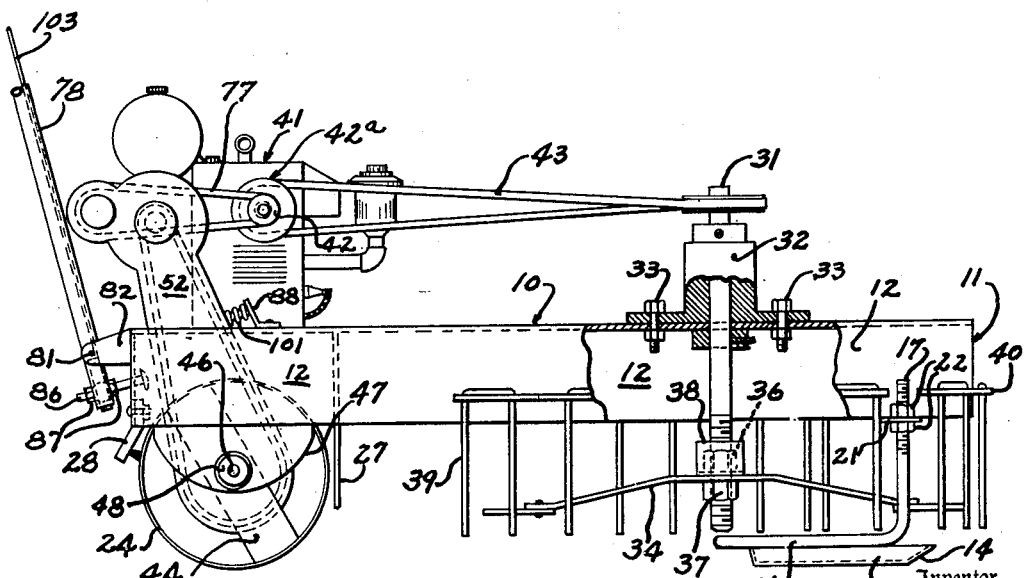
Fig. 2 is a side elevational view partly broken away and in section.

From the foregoing the method of constructing and operating our improved lawn mower may now be readily explained and understood. With the mower assembled as shown in the drawings, the front end thereof is supported on the sliding plate 14 and the rear end is supported on the rollers 24 and 26. With the motor 41 in operation, cutter 34 is driven through the belt 43. With the handle of the mower in the position shown in Figs. 2 and 3 of the drawing it will be apparent that the spring 101 rocks the entire gear housing 52 about the shaft 58, thereby tightening the belt 77, causing rotation of shafts 73, 66 and 58 and hence the rollers 24 and 26, thereby to drive the mower along the ground. As stated, the handle is so proportioned that when released by the operator the weight of the upper end thereof causes the round-headed stud 86 to engage the rear of the gear housing 52 and rock the same forwardly, thereby to loosen the belt and stop forward motion of the mower. The position assumed by the handle to rock the gear housing 52 forwardly to loosen the belt 77 is illustrated in Figs. 5 and 6. It is to be noted that the forward motion of the mower over the ground may be stopped while permitting the cutter blade 34 to continue rotation. We are enabled therefore to cut close to trees, buildings, curbs and the like, without the danger of the mower driving itself into such obstructions.

In some instances it is desirable to be able to pull backwardly on the handle without disconnecting the motor from the supporting and driving rollers. To accomplish this, we provide a pin 102 in the lower end of one of the tubular handle members, for instance member 79, with a sliding fit so that it may be raised and lowered. To the pin 102 we secure a wire or other elongated flexible member 103 which extends up through the handle 79 and which terminates in an eye 104 whereby it may be grasped by the operator and pushed downwardly a sufficient distance for the pin 102 to engage the downturned flange 12 when the handle is lowered and before the drive is disengaged. With the pin thus lowered, the handle may be used to lift the front of the mower without disengaging the rollers from the motor. Whenever it is desired for the drive to again be disengaged automatically, the pin 101 is retracted. The friction of the flexible member 103 in the handle member 79 is sufficient to prevent the pin 102 from dropping down by its own weight.

It is to be especially noted that in our improved drive mechanism all of the chains and sprockets are completely enclosed in the housing 53. By providing a suitable lubricant plug 106, and sealing the bearings 59 and 61 with suitable seals 107, we are enabled to operate the chain, sprockets, and gears in a bath of oil. This assures long life for these parts and reduces considerably the power required to drive the mower.

From the foregoing it will be apparent that we have devised an improved lawn mower embodying a combined power transmission and clutch interposed between the driving motor and supporting rollers which is pivotally mounted on the supporting rollers. In actual operation we have found that a mower constructed in accordance with our invention is highly satisfactory, economical of construction, safe, and positive in operation.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are specifically set forth in the appended claims.

What we claim is:

1. In a lawn mower embodying a body, a driving motor and a cutting blade mounted on the body, the combination of a pair of ground engaging driving rollers spaced axially apart, a single power transmission means for driving both rollers disposed between the adjacent ends of said supporting rollers embodying a driving shaft having projecting ends, means to secure the adjacent ends of said rollers to the projecting ends of said shaft, a second shaft projecting from the power transmission means and operatively connected to the driving shaft, friction drive means interposed between the motor and the second shaft, and means to connect and disconnect the friction drive means and second shaft.

2. Apparatus as defined in claim 1 in which the means to connect and disconnect the friction drive means includes mechanism for pivoting the power transmission means about said driving shaft.

3. In a lawn mower embodying a body carrying a driving motor and cutter blade and supported by a driving roller, together with a pivotally mounted handle at the rear of the body, the combination of a transmission and clutch unit interposed in power transmitting relation between the motor and roller comprising a gear housing having a driving shaft, means to secure the driving shaft to the roller in axial alignment with the rotational axis of the roller, a driven shaft operatively connected to the driving shaft, a pulley on the driven shaft, a belt connecting the motor to the driven shaft, and means operable by raising the mower handle to pivot the gear housing about the driving shaft thereby to loosen the belt and disengage the roller from the motor.

4. Apparatus as defined in claim 3 in which the transmission unit is constructed and arranged for gravity to rock the same toward a position to tighten the belt connecting the motor and driven shaft.

5. Apparatus as defined in claim 3 in which the transmission unit is spring biased toward a position to tighten the belt connecting the motor and driven shaft.

6. In a lawn mower embodying a body having mounted thereon a driving motor and a cutting blade, the combination of a pair of axially aligned spaced apart driving and supporting rollers journalled at their outer ends on the body, a power transmission housing interposed between the inner ends of the rollers and having a driving shaft projecting from either side at the lower end thereof, means to connect the inner ends of rollers to the projecting ends of said driving shaft and with said shaft disposed in alignment with the rotational axes of the rollers, a driven shaft projecting from the gear housing adjacent the upper end thereof and operatively connected to the driving shaft, pulleys on the driven shaft and motor, a belt passing over said pulleys, a spring for biasing the upper end of the housing toward a position to tighten said belt about the pulleys, a handle pivoted adjacent its lower end to the rear of the mower, and means carried by the lower end of the pivoted handle disposed to contact the side of the housing and move the housing to a position to loosen said belt when the upper end of the handle moves downwardly.

7. In a lawn mower embodying a body carrying a rotatable cutting blade and a driving motor the combination of a pair of axially aligned spaced apart rollers for supporting one end of the mower, means to rotatably support the non-adjacent ends of the rollers from the mower body, a common shaft extending between and connected to the adjacent ends of the rollers, a second shaft supported for rotation above said common shaft and disposed to be moved on a radius struck from the center of the common shaft, friction drive means disposed to connect and disconnect the motor in driving relation to said second shaft when the latter is moved away from and toward the motor respectively, means to move said second shaft away from and toward the motor, and means to transmit rotation imparted to the second shaft to said common shaft.

8. In a mower embodying a body supported by at least one ground engaging driving member and including a driving motor and a cutting blade driven by said motor and mounted on the body, the combination of mechanism for transmitting power from the motor to the driving member mounted for pivotal movement toward and from the motor with the rotational axis of the driving member as the pivot point, drive means between the motor and power transmission means, and means to rock the power transmission means about its pivot point thereby to connect and disconnect the drive means.

9. Apparatus as defined in claim 6 in which there is provided on the handle a manually operable lock mechanism constructed and arranged to lock the handle in raised position.

LUCIUS N. SMITH.
ALEXANDER SMITH.

REFERENCES CITED

The following references are of record in the file of this patent:

UNITED STATES PATENTS

| Number | Name | Date |
|---|---|---|
| Re. 18,944 | Beazley | Sept. 12, 1933 |
| 1,886,408 | Locke et al. | Nov. 8, 1932 |
| 2,066,174 | Cregier | Dec. 2, 1936 |
| 2,151,659 | Funk | Mar. 21, 1939 |
| 2,153,771 | Orr | Apr. 17, 1939 |
| 2,160,259 | Cooper | May 30, 1939 |
| 2,167,222 | Shelor | July 25, 1939 |
| 2,220,705 | Burckes | Nov. 5, 1940 |